J. A. Lawrence,
Harness Saddle,
No 8,238. Patented July 22, 1851.
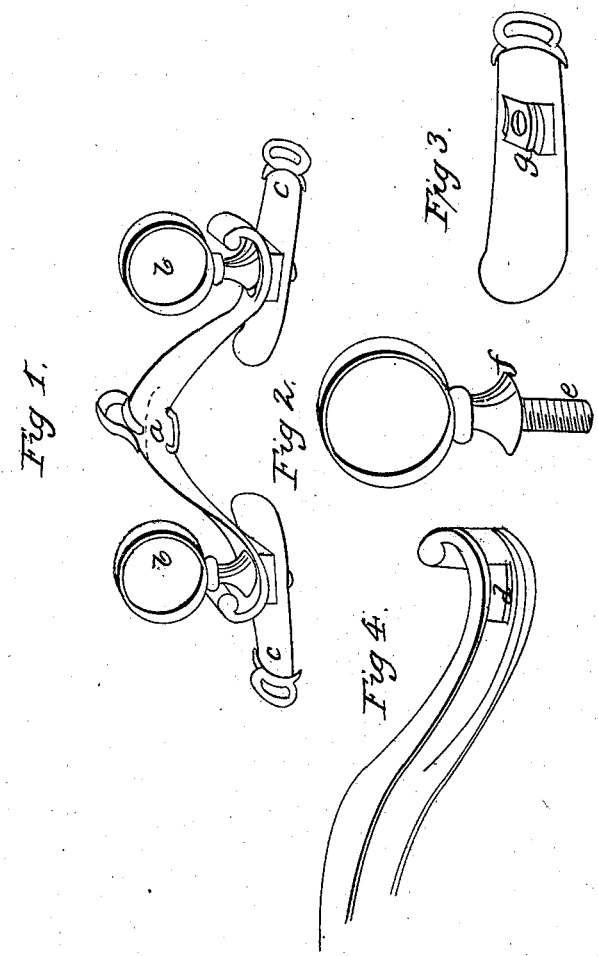

UNITED STATES PATENT OFFICE.

JAMES A. LAWRENCE, OF NEW HAVEN, CONNECTICUT, ASSIGNOR TO ROBERTS AND SAMPSON.

SADDLE-TREE FOR HARNESS.

Specification of Letters Patent No. 8,238, dated July 22, 1851.

*To all whom it may concern:*

Be it known that I, JAMES A. LAWRENCE, of the city, town, and county of New Haven, in the State of Connecticut, have invented a new and Improved Mode of Constructing Adjustable Padtrees for Harnesses; and I do hereby declare that the following is a full, clear, and exact description of the construction and operation of the same, reference being had to the accompanying drawings, making part of this specification, in which—

Figure 1 is a perspective view of the pad-trees complete showing the yoke *a*. The terrets *b*, *b*, and the pad irons *c*, *c*, fitted together as for use. Fig. 2 shows the terret or rein-guide with a screw cut on the lower end under the shoulder. Fig. 3 shows the pad-strap, or pad-iron, as it is more commonly called, with a nut *g*, cast or made upon it through which is a female screw. Fig. 4 is a view of part of the yoke turned so as to show the slot *d*, through which the screw of the terret is intended to pass into the nut on the pad-iron.

The nature of my invention consists in constructing a padtree in such a manner that the pad-iron can be adjusted and secured at any required angle from the yoke, so as to fit easily the back of the horse on which it is placed.

To enable others skilled in the art to make and use my invention I will now describe its construction and operation.

All the parts described I make of malleable iron but they may be made of any other proper material. The end of the yoke, through which the slot *d* is cut, I construct so as to form a segment of a circle. The face of the shoulder *f* of the terret is rounded so as to fit smoothly on the surface of the yoke when the screw *e*, passes through the slot *d*, in the yoke. This slot I cut of convenient width to allow the projection on the nut *g* of the pad-iron to pass, and of such length as will permit the pad-iron to be fixed at any necessary angle. The pad-iron I make with a nut as shown in the drawing through which is a female screw to receive the screw of the terret iron. A shoulder is cut on each side of the nut with a proper curve to fit the inside of the yoke as shown in the drawing at *g*, making a small projection on the nut which passes into the slot of the yoke and plays back and forth easily.

Thus, the curved shoulder of the nut of the pad-iron fits to the lower side of the yoke while the rounded shoulder of the terret fits to the upper side, and the projection on the nut fits in the slot. In this way the pad-iron moving upon the curved end of the yoke may be placed at any angle required for use and secured in its place by the screw of the terret in the end of the pad-iron.

I do not claim as my invention the yoke, the terret, or the pad-iron separate from each other; but What I do claim as my invention and wish to secure by Letters Patent is—

The combination and arrangement of the yoke the terret and the pad iron in such manner that the pad-iron may be adjusted at any angle required for use and immediately secured firmly in its place by a screw on the terret-iron passing through the yoke into the pad-iron substantially as shown in the drawings and herein set forth.

JAMES A. LAWRENCE.

In presence of—
Lucius G. Peck,
Henry B. Harrison.